Nov. 2, 1926.

B. STEELE

ROTARY HARROW

Filed August 21, 1923

Inventor
Bert Steele,
By
Attorney

Patented Nov. 2, 1926.

1,605,795

UNITED STATES PATENT OFFICE.

BERT STEELE, OF GURLEY, NEBRASKA.

ROTARY HARROW.

Application filed August 21, 1923. Serial No. 658,608.

The principal object of the invention is to provide a machine of the character mentioned adapted particularly for dressing summer-tilled land to keep it clean from weeds without working the ground too deeply, thus saving the moisture below. A further object is to provide a machine comprising a frame with means for supporting therein a plurality of harrow cylinders with means for the vertical adjustment of the same to regulate the depth of penetration of the ground working elements in the soil.

With these objects in view the invention consists in a construction and combination of parts of which a preferred embodiment is shown in the accompanying drawings, wherein:—

Figure 1:
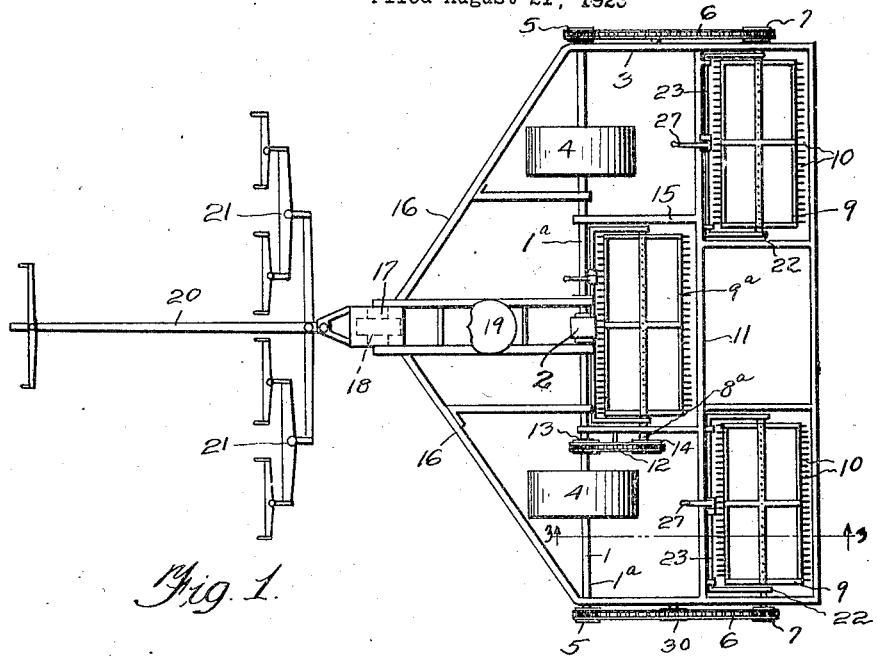
Figure 1 is a top plan view of the invention.
Figure 2:
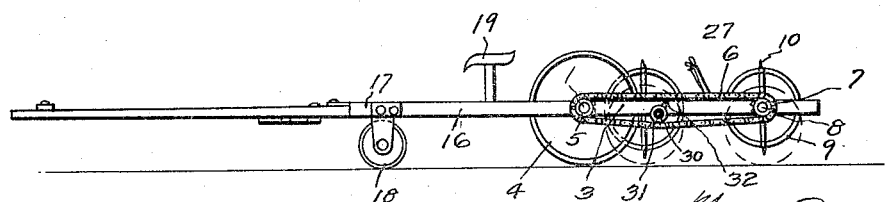
Figure 2 is a side elevational view.
Figure 3:
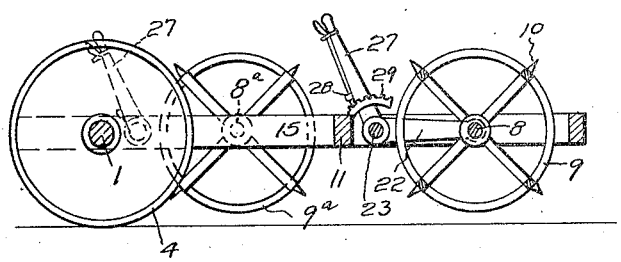
Figure 3 is a section on the line 3—3 of Figure 1.
Figure 4:
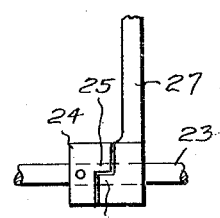
Figure 4 is a detail elevational view showing the connection between the adjusting levers and the cylinder supporting means.
Figure 5:
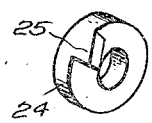
Figure 5 is a detail perspective view showing one of the collars carried by the cylinder supporting means for engagment with the adjusting levers.

The invention comprises a machine frame having an axle 1 consisting of the sections 1ª interconnected at the center by a differential 2, the axle sections being carried by a frame 3 and carrying the ground wheels or bull wheels 4, the axle sections being extended laterally beyond the frame and receiving sprocket wheels 5 traversed by chains 6 also traversing the sprocket wheels 7 carried on the protruding extremities of the shafts 8 of the harrow cylinders 9, the latter being provided with peripheral teeth 10 for engagement with the soil. The frame 3 is divided transversely by an intermediate bar 11 in rear of which the cylinders 10 are carried and to the forward of which an intermediate cylinder 9ª is disposed, the latter having peripheral teeth identical with the teeth 10 and being provided with a shaft 8ª driven from one of the axle sections 1ª by means of a chain 12, travelling sprockets 13 and 14 carried respectively on one of the axle sections 1ª and the shaft 8ª. The shaft 8ª which supports the cylinder 9ª is journalled in the spaced bars 15 extending from the transverse bar 11 to the forwardly converging bars 16 which at their forward ends are secured to the sides of a truck 17, the forward end of which is supported on the caster wheel 18 and the rear end of which is supported from the axle 1, a seat 19 being carried for the use of the operator and a draft pulley 20 being provided in connection with the whiffle-trees 21 for the movement of the machine by draft animals which obviously may be replaced by the tractor when conditions permit.

The cylinders 9 are adjustable vertically to vary the depth of penetration of their ground engaging teeth 10 and to this end the shafts 8 are journaled in the extremities of arms 22 the rear ends of which are mounted on rock shafts 23 journaled in the frame just to the rear of the transverse bar 11. The rock shafts are provided with collars 24 formed with lateral projections 25 engageable with corresponding projections 26 carried on the hub portions or hand levers 27, the latter being provided with latches 28 for engagement with the toothed sectors 29 secured to the bar 11. Obviously adjustment of the levers 27 to dispose the latches in engagement with different teeth of the sectors will vary the elevation of the cylinders 9 to suit the conditions under which the machine is to be worked.

In order to maintain a uniform tension in the chains 6 by which the cylinders 9 are rotated, idler sprockets 30 are provided being rotatably mounted on studs 31 which are adjustable in slots 32 formed in the side portions of the frame 3.

Having described the invention, what is claimed as new and useful is:—

A harrow having a frame, rock shafts mounted in the frame, harrow cylinders operatively supported by the rock shafts and means for adjusting the depth of penetration of the cylinders and consisting of collars carried by the rock shafts and formed with lateral projections, and latch controlled hand levers and associated toothed sectors, said hand levers having hub portions carrying projections engaging the corresponding projections on the collars, whereby movement upwardly of the harrow cylinders is uncontrolled but movement downwardly restricted by engagement of the projections on the collars and hub portions respectively.

In testimony whereof he affixes his signature.

BERT STEELE.